(12) United States Patent
Sekiyama (10) Patent No.: US 9,098,992 B2
(45) Date of Patent: Aug. 4, 2015

(54) ELECTRONIC APPARATUS (71) Applicant: Icom Incorporated, Osaka (JP)

(72) Inventor: Yoshio Sekiyama, Osaka (JP)

(73) Assignee: Icom Incorporated, Osaka (JP)

( * ) Notice: Subject to any disclaimer, the term of this patent is extended or adjusted under 35 U.S.C. 154(b) by 197 days.

(21) Appl. No.: 13/755,328

(22) Filed: Jan. 31, 2013

(65) Prior Publication Data

US 2013/0285809 A1 Oct. 31, 2013

(30) Foreign Application Priority Data

Apr. 26, 2012 (JP) .................................. 2012-101792

(51) Int. Cl.
*G08B 21/00* (2006.01)
*G08B 21/20* (2006.01)
*H04M 1/18* (2006.01)
*H04B 1/38* (2015.01)

(52) U.S. Cl.
CPC ........ *G08B 21/20* (2013.01); *H04B 2001/3894* (2013.01); *H04M 1/18* (2013.01)

(58) Field of Classification Search
CPC ........ G08B 3/10; G08B 21/088; G08B 25/10; G08B 25/016; A61F 13/42
USPC ................ 340/540, 573.1, 573.6, 604, 539.1, 340/539.11; 455/575.1; 600/529, 508
See application file for complete search history.

(56) References Cited

U.S. PATENT DOCUMENTS

| | | | | |
|---|---|---|---|---|
| 6,157,303 | A * | 12/2000 | Bodie et al. ................ | 340/573.6 |
| 8,295,895 | B2 * | 10/2012 | Obata ........................ | 455/575.1 |
| 2009/0174759 | A1 * | 7/2009 | Yeh et al. ................... | 348/14.01 |
| 2009/0295566 | A1 * | 12/2009 | Weintraub ............... | 340/539.11 |
| 2010/0210325 | A1 * | 8/2010 | Obata ........................ | 455/575.1 |
| 2011/0148642 | A1 * | 6/2011 | Cutler et al. ............... | 340/573.6 |
| 2011/0174235 | A1 * | 7/2011 | Vinano et al. .................. | 119/712 |
| 2012/0246801 | A1 * | 10/2012 | Cutler et al. .................. | 2/209.13 |
| 2013/0128476 | A1 * | 5/2013 | Liou ............................. | 361/752 |
| 2013/0285809 | A1 * | 10/2013 | Sekiyama .................... | 340/540 |

FOREIGN PATENT DOCUMENTS

JP H4-135038 U 12/1992

OTHER PUBLICATIONS

ICOM Inc., Pre-Release Information VHF Marine Transceiver IC-M92D, Leaflet, Feb. 16, 2012, p. 1-2, 12YS0070, Japan (Distributed at Miami International-Boat Show 2012 on Feb. 16, 2012).

* cited by examiner

*Primary Examiner* — Hoi Lau
(74) *Attorney, Agent, or Firm* — Muncy, Geissler, Olds & Lowe, P.C.

(57) ABSTRACT

The electronic apparatus includes a submergence detector for detecting submergence of the electronic apparatus in the water and retrieval thereof, a light-emitting device provided within an enclosure of the electronic apparatus, an illumination circuit for lighting the light-emitting device when an illumination signal is input, a controller for causing the light-emitting device to blink by generating the illumination signal at prescribed blinking intervals at least during a period from a point of submergence to a point of retrieval of the electronic apparatus and inputting the illumination signal to the illumination circuit, and a power control circuit for activating the controller by supplying electric power thereto if the electric power is not supplied to the controller when the submergence detector detects submergence.

10 Claims, 7 Drawing Sheets

| ALARM | |
|---|---|
| FLASHING | ON ▶ |
| DURATION | 20 ▶ |
| CYCLE | 0.5 ▶ |
| SOUND | ON ▶ |
| [EXIT] [BACK] | [ENT ] |

Fig. 3B

FLASHING
✓ On
  Off

[EXIT] [BACK]          [ENT ]

Fig. 3C

DURATION
  0 sec
  10 sec
✓ 20 sec
  30 sec

[EXIT] [BACK]          [ENT ]

Fig. 3D

CYCLE
✓ 0.5 sec
  1 sec
  2 sec
  4 sec

[EXIT] [BACK]          [ENT ]

Fig. 3E

SOUND
✓ On
  Off

[EXIT] [BACK]          [ENT ]

ELECTRONIC APPARATUS

CROSS REFERENCE TO RELATED APPLICATION

The present invention is related to, claims priority from, and incorporates by reference Japanese Patent Application No. 2012-101792, filed on Apr. 26, 2012.

BACKGROUND OF THE INVENTION

1. Field of the Invention

The present invention relates to an electronic apparatus and, more particularly, to an electronic apparatus which stays afloat on water even when dropped in the water.

2. Description of the Related Art

There exist a large number of electronic apparatuses, such as marine transceivers, which are used in areas close to the water. Because this kind of electronic apparatus may accidentally be subjected to splash of water or dropped in the water, the apparatus featuring waterproof capability which prevents water intrusion into an internal space is made available today. Also, if the electronic apparatus sinks when dropped in the water, it will become impossible to retrieve the apparatus. To avoid this inconvenience, Japanese Laid-open Utility Model Publication No. H04-135038 discloses an arrangement in which an apparatus remains afloat on the water when dropped therein.

If the apparatus is dropped in the water during nighttime or poor visibility conditions, however, there may be a possibility that it is impossible to find the apparatus even if the apparatus stays afloat on the water surface. One chronic problem is that it is impossible to retrieve the apparatus despite the fact that the apparatus is still afloat on the water surface in such cases. Although it might be possible to provide the apparatus with a light-emitting diode (LED) which is triggered to blink when the apparatus is dropped in the water, parameters like blinking intervals of the LED lamp that would enable a user to easily find the apparatus can vary from one user to another.

BRIEF SUMMARY OF THE INVENTION

It is an object of the invention to provide an electronic apparatus which can easily be found when dropped in the water even during nighttime or poor visibility conditions.

An electronic apparatus of the present invention comprises a submergence detector for detecting submergence of the electronic apparatus including a situation where the electronic apparatus has been dropped and stays afloat on the water surface and a situation where the electronic apparatus has been dropped and stays underwater as well as a situation where the electronic apparatus has been retrieved from the water, a light-emitting device provided within an enclosure of the electronic apparatus, an illumination circuit for lighting the light-emitting device when an illumination signal is input, a controller for making the light-emitting device blink by generating the illumination signal at prescribed blinking intervals at least during a period from a point of submergence to a point of retrieval of the electronic apparatus and inputting the illumination signal to the illumination circuit, and a power control circuit for activating the controller by supplying electric power thereto if the electric power is not supplied to the controller when the submergence detector detects submergence.

The controller may accept a setting of the blinking intervals entered through an operating device manipulated by a user and generate the illumination signal at the set blinking intervals.

The controller may continue to generate the illumination signal at the blinking intervals for a prescribed illumination continuation time even after the submergence detector has detected retrieval of the electronic apparatus.

The controller may accept a setting of the blinking intervals entered through an operating device manipulated by a user and continue to generate the illumination signal at the blinking intervals for the prescribed illumination continuation time.

The electronic apparatus may further comprises a display and a key panel, and the light-emitting device may backlight at least one of the display and the key panel.

The submergence detector may include a pair of electrodes, and the submergence detector may detect submergence of the electronic apparatus when the electrodes are conducted to each other, and detect retrieval of the electronic apparatus when the electrodes become no longer conducted to each other.

The electronic apparatus may further comprise a speaker and an amplifier for driving the speaker, and the controller may generate an alert sound signal for notifying a user of the location of the electronic apparatus itself during the period from the point of submergence to the point of retrieval of the electronic apparatus and inputs the alert sound signal to the amplifier.

According to this invention, the light-emitting device illuminates when the hand-held electronic apparatus is dropped in the water. This allows a user to easily find the electronic apparatus even during nighttime or poor visibility conditions.

REFERENCE SIGNS LIST

1 Transceiver
11 Enclosure
16 Display
17 Key panel
25 Speaker
30 Control unit
33 LED on/off circuit
61 LED

DETAILED DESCRIPTION OF THE INVENTION

Figure 1A:
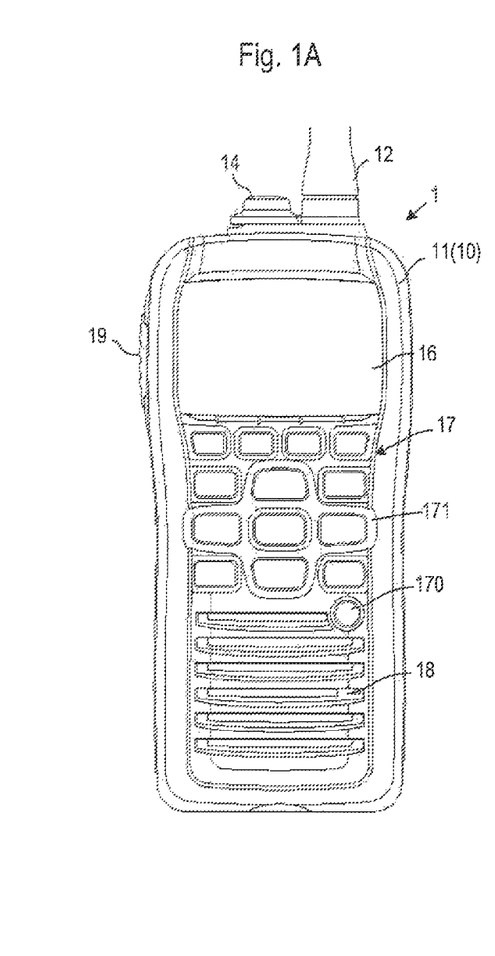
FIG. 1A is a front view of a transceiver according to an embodiment of the invention.
Figure 1B:
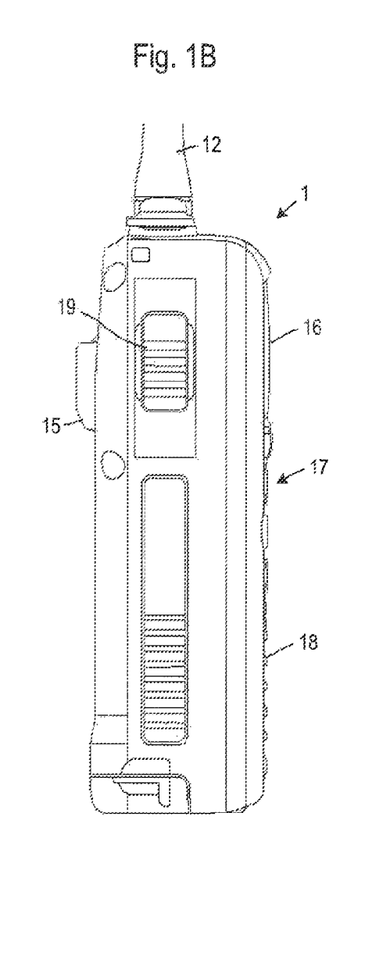
FIG. 1B is a right side view of the transceiver.
Figure 1C:
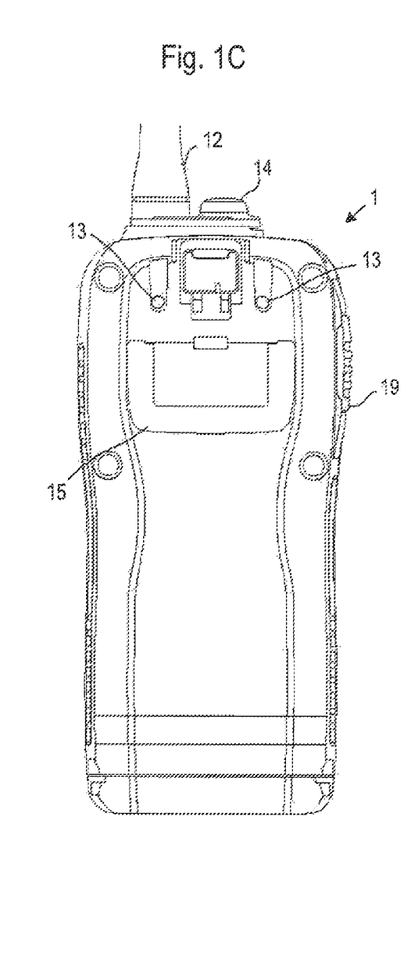
FIG. 1C is a rear view of the transceiver.

A transceiver according to an embodiment of the present invention is described with reference to the accompanying drawings. FIGS. 1A to 1C illustrate the external appearance of the transceiver. Specifically, FIG. 1A illustrates a front view of the transceiver, FIG. 1B illustrates a right side view of the transceiver, and FIG. 1C illustrates a rear view of the transceiver.

First, a general description of the transceiver 1 is described. The transceiver 1 is a hand-held apparatus used primarily for performing marine radio communications in the marine very high frequency (VHF) band. The transceiver 1 includes a main body 10 and a rod antenna 12 provided on a top surface of the main body 10. The transceiver 1 has a small total weight due to employing a lightweight, high-capacity lithium ion battery as a power source and all, and an waterproof enclosure 11. The transceiver 1 thus constructed does not submerge but stays afloat when dropped in the water. Specifically, the transceiver 1 floats on the water surface with turning up a front surface of the enclosure 11 and turning down a rear surface due to the internal weight distribution. For the sake of explanation in this Specification, a situation where the transceiver 1 is dropped in the water is referred to as "submergence".

A pair of electrodes 13 are provided on the rear surface of the enclosure 11. These electrodes 13 are electrically conducted to each other through the water when the transceiver 1 submerges. Conduction between the electrodes 13 boots an internal circuit of the transceiver 1, and makes the circuit execute a submergence notification operation to notify a user of the submergence situation and location of the transceiver 1. LEDs 61 (refer to FIG. 2) for backlighting a display 16 and a key panel 17 are flashed (blinked) and a speaker 25 (refer to FIG. 2) is blared out an alert sound in the submergence notification operation. When the transceiver 1 has been taken out of the water, the alert sound is stopped and a speaker grill drainage operation is started instead. The speaker grill drainage operation is a process of letting out stuck water in a speaker grill 18 by a sound pressure of a drain sound generated loudly through the speaker 25.

Next, the external appearance of the transceiver 1 is described in detail. As already mentioned, the transceiver 1 has the main body 10 including the enclosure 11, and the antenna 12 provided on the top surface of the enclosure 11. The antenna 12 is mounted in an upright position on the top surface of the enclosure 11. The antenna 12 is a rod antenna structured by fitting a coiled antenna wire in a plastic pipe.

Provided on the front of the enclosure 11 are, from top to bottom, the display 16, the key panel 17 and the speaker grill 18. The speaker 25 is provided just behind the speaker grill 18. On a right side surface of the enclosure 11, there is provided a push-to-talk (PTT) switch 19. On the top surface of the enclosure 11, a speaker/microphone (SP/MIC) connector 14 covered with a water-proof cap is provided to the left of the antenna 12 as viewed from the front.

Figure 2:
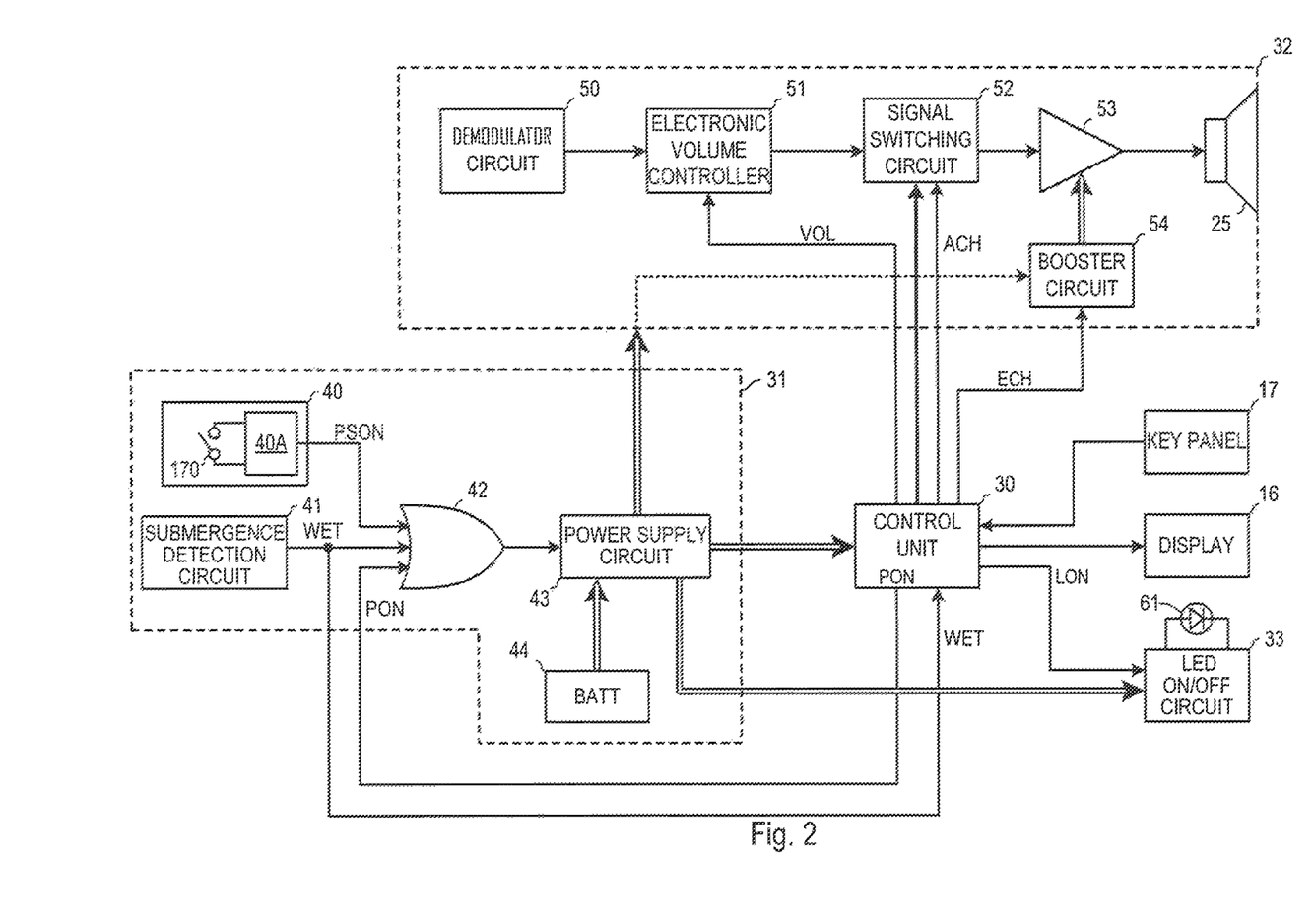
FIG. 2 is a block diagram of electronic circuit of the transceiver.

The display 16 is a liquid-crystal display (LCD) which is illuminated from behind by the backlight LED 61 (refer to FIG. 2). The display 16 displays a communication channel in use, sound volume, as well as various option items. The key panel 17 is provided with an arrangement of a plurality of key switches including a power key 170 and direction keys 171. The power key 170 is a key switch used to power the transceiver 1 on and off. The transceiver 1 is switched from an OFF state to an ON state, or vice versa, when the user depresses the power key 170 for a specific period of time (e.g., 2 seconds or more). The direction keys 171 include up/down and left/right keys and a select key which are used for selecting or setting option items presented on the display 16. The key panel 17 is also backlit by LEDs 61 (refer to FIG. 2). The individual key switches of the key panel 17 have transparent or semitransparent keytops which are illuminated from behind when the backlight LEDs 61 are turned on.

A clip-on holder 15 and the pair of electrodes 13 are provided on the rear surface of the enclosure 11. The clip-on holder 15 is located at a middle part of the rear surface of the enclosure 11 and has a belt clip attached thereto. The electrodes 13 which are located at upper left and right positions on the rear surface are conducted to each other through the water when the transceiver 1 submerges. A control unit 30 (refer to FIG. 2) serving as a controller of the transceiver 1 detects submergence of the transceiver 1 by the conduction of the electrodes 13.

Described below with reference to a block diagram of FIG. 2 is the circuit configuration of the transceiver 1. Illustrated in FIG. 2 is a circuit related to power control and audio signal processing operations among many circuits of the transceiver 1. The transceiver 1 includes the control unit 30 serving as the controller, a power control circuit 31, a receiver circuit 32 and an LED ON/OFF circuit 33. The control unit 30 is made of a so-called microcontroller (abbreviated as MCU or μC) including a central processing unit (CPU), a memory, various kinds of interfaces, an analog-to-digital (A/D) converter and a D/A converter, for example. The control unit 30 controls the overall working of the transceiver 1 including setup operations represented in FIG. 4 and a submergence monitoring process represented in FIGS. 5 to 7A/7B. The control unit 30 is connected to the display 16 and the key panel 17 as well.

The power control circuit 31 which includes a battery 44 controls the supply of power to the control unit 30, the receiver circuit 32 and the LED ON/OFF circuit 33. The receiver circuit 32 is a circuit for receiving a VHF signal and generating an audio signal. The speaker 25 is connected to a final stage of the receiver circuit 32. The LED ON/OFF circuit 33 is a circuit which lights the LEDs 61 in accordance with an LED ON signal LON input from the control unit 30. As already mentioned, the LEDs 61 illuminate the display 16 and the key panel 17 from behind as a backlight and are controlled to blink when the transceiver 1 is dropped in the water to notify the location thereof. Meanwhile, although FIG. 2 illustrates only one LED 61, a plurality of LEDs 61 capable of producing a sufficient luminous intensity to illuminate the entirety of the display 16 and the key panel 17 are actually provided.

The power control circuit 31 includes a power switching circuit 40, a submergence detection circuit 41, an OR circuit 42 and a power supply circuit 43 in addition to the battery 44. The battery 44 is a lithium ion battery which provides a voltage of 7.4 V, for example. The power switching circuit 40 includes the aforementioned power key 170 and a hold circuit 40A. The hold circuit 40A outputs a power switch-on signal PSON. When the power key 170 is depressed for a specific period of time or more, the hold circuit 40A turns the power switch-on signal PSON from a low (L) state to a high (H) state, or vice versa. The power switch-on signal PSON is input into the OR circuit 42. The submergence detection circuit 41 which includes the aforementioned electrodes 13 outputs a submergence signal WET. The submergence detection circuit 41 holds the submergence signal WET at the H state while the electrodes 13 remain conducted to each other. The submergence signal WET is input into the OR circuit 42 and the control unit 30. Input into the OR circuit 42 in addition to the PSON and WET signals is a power supply keep-alive signal PON which will be described later.

An output of the OR circuit 42 is input into the power supply circuit 43. When an H signal is input from the OR circuit 42, the power supply circuit 43 supplies electric power from the battery 44 to the control unit 30, the receiver circuit 32 and the LED ON/OFF circuit 33 to set the transceiver 1 in a power-on state.

Accordingly, the OR circuit 42 outputs the H signal when the power switch-on signal PSON is in the H state with the power key 170 turned on, when the submergence signal WET is set to the H state as a result of detection of submergence, or when the power supply keep-alive signal PON of the control unit 30 is in the H state. During inputting the H signal from the OR circuit 42, the power supply circuit 43 supplies power to the transceiver 1.

The power supply circuit 43 lowers or raises the voltage of the battery 44 and supplies the lowered voltage, the raised voltage or the unchanged battery voltage to the individual circuits in accordance with operating voltages thereof. Specifically, the power supply circuit 43 supplies 3 volt to the control unit 30 and 5 volt to the receiver circuit 32 and the LED ON/OFF circuit 33.

During the H state of the LED ON signal LON input from the control unit 30, the LED ON/OFF circuit 33 feeds the power to the LEDs 61 to light. When the LED ON signal LON from the control unit 30 is kept in the H state, the LEDs 61 are continuously lit. When the control unit 30 switches the LED ON signal LON to periodically alternate between the H and L states, the LEDs 61 blink in sync. When the user performs an operation for turning on the backlight using the key panel 17, the control unit 30 switches the LED ON signal LON to the H state to light the LEDs 61. Also, when the submergence signal WET input from the submergence detection circuit 41 is turned from the L state to the H state, the control unit 30 switches the LED ON signal LON to periodically alternate between the H and L states, making the LEDs 61 blink at a blinking interval CYCLE. The control unit 30 keeps the LEDs 61 blinking for a blinking continuation time DURATION even after the submergence signal WET has turned from the H state to the L state. The transceiver 1 allows the user to select whether to activate or deactivate blinking (FLASHING) of the LEDs 61 in the event of submergence (WET=H) and to set the blinking intervals CYCLE as well as the blinking continuation time DURATION after retrieval of the transceiver 1.

The receiver circuit 32 includes a demodulator circuit 50, an electronic volume controller 51, a signal switching circuit 52, an audio frequency (AF) amplifier 53, the speaker 25 and a booster circuit 54. The demodulator circuit 50 is a circuit for receiving a signal from a communications counterpart and demodulating the signal to produce a received signal which is an audio signal. The demodulated received signal is input into the electronic volume controller 51, which is a circuit for regulating the signal level of the input signal. The electronic volume controller 51 is a component which may be selected from a variety of types including a variable gain amplifier and a ladder resistor unit. The electronic volume controller 51 is controlled by a volume control signal VOL input from the control unit 30.

The signal switching circuit 52 selects either the received signal input from the electronic volume controller 51 or an audio signal input from the control unit 30 and delivers the selected signal to the AF amplifier 53. The control unit 30 inputs the audio signal representative of the alert sound, the drain sound or various kinds of beep sounds to the signal switching circuit 52. The signal switching circuit 52 selects either the audio signal input from the electronic volume controller 51 or the audio signal input from the control unit 30 in accordance with an audio signal switching signal ACH which is a control signal input from the control unit 30.

The alert sound is an intermittent sound generated during execution of the submergence notification operation. The alert sound is a sine wave of approximately 3 kHz which can easily be recognized by human hearing. While an alert sound signal input into the AF amplifier 53 may be set at a maximum signal level, the signal level may be adjusted to a proper level to notify the user of the location of the transceiver 1 and yet to suppress consumption of the battery 44.

The drain sound is a sound of a rectangular wave of 300 Hz generated during execution of the speaker grill drainage operation. While the frequency and waveform of the drain sound may be properly selected in accordance with such conditions as properties of the speaker 25, the internal capacity of the speaker grill 18 and the shape of the relevant transceiver 1, it is preferable to select a frequency in the range of 100 Hz to 500 Hz and a rectangular or sawtooth waveform. The waveform of the drain sound has an amplitude corresponding to a maximum input voltage of the AF amplifier 53. It is possible to efficiently drain water stuck in the speaker grill 18 by making the speaker 25 vibrate with the drain sound signal having the aforementioned frequency, waveform and amplitude.

As the signal switching circuit 52 is provided in a subsequent stage of the electronic volume controller 51 in the receiver circuit 32, the drain sound signal and the alert sound signal input into the AF amplifier 53 with full volume free from effect of the electronic volume controller 51. Meanwhile, when feeding an ordinary beep sound signal to the AF amplifier 53 from a point in the subsequent stage of the electronic volume controller 51, it is desirable to input the beep sound signal into the signal switching circuit 52 after pre-adjusting the level of the beep sound signal in the control unit 30.

The AF amplifier 53 amplifies the input audio signal to a level that is high enough to drive the speaker 25. The amplified audio signal is input into the speaker 25. Power is supplied to the AF amplifier 53 through the booster circuit 54. The booster circuit 54 supplies the 5 V power fed from the power supply circuit 43 directly, or the voltage boosted power, to the AF amplifier 53 in accordance with a voltage switching signal ECH input from the control unit 30. When the voltage switching signal ECH is in the L state, the booster circuit 54 directly supplies the 5V power fed from the power supply circuit 43 to the AF amplifier 53 by way of a bypass line. When the voltage switching signal ECH is in the H state, the booster circuit 54 boosts the voltage to 8 V and supplies this voltage power to the AF amplifier 53. While the booster circuit 54 is preferably a charge pump circuit, it is possible to employ a different type of circuit (such as a chopper circuit). Alternatively, it is possible to employ an arrangement including no voltage boosting circuit, wherein the voltage (7.4 V) of the battery 44 is directly led and supplied to the AF amplifier 53 when the voltage switching signal ECH is in the H state.

The AF amplifier 53 outputs approximately 0.8 W maximum with the ordinary 5 V power, and outputs approximately 1.8 to 2.0 W maximum with the boosted 8 V power. It is possible to efficiently drain water from the speaker grill 18 with a high sound pressure by making the speaker 25 vibrate with the drain sound signal having a high output (amplitude) level produced by use of the boosted power. The speaker 25 used in the transceiver 1 is of a type capable of withstanding a 2 W input.

The control unit 30 begins to operate for controlling the working of the transceiver 1 when the power is supplied from the power supply circuit 43. In particular, the control unit 30 monitors changes in the submergence signal WET input from the submergence detection circuit 41 and carries out the below-described operations. Incidentally, the following operational description deals with a case that the blinking of the LEDs 61 and generation of the alert sound which are included the submergence notification operation are both activated.

When the submergence signal WET input from the submergence detection circuit 41 turns from the L state to the H state, the control unit 30 recognizes that the transceiver 1 is in a submergence situation and operates as follows. If the submergence signal WET turns to the H state, the output of the OR circuit 42 turns to the H state and power of the battery 44 is supplied to the control unit 30 through the power supply circuit 43 even when the transceiver 1 is in a power-off state. The supplying power activates the control unit 30 to perform the following operations:

(1) The control unit 30 makes the LEDs 61 blink. For this purpose, the control unit 30 switches the LED ON signal LON input into the LED ON/OFF circuit 33 from the L state to the H state, and vice versa, at the prescribed blinking intervals CYCLE. When the LED ON signal LON is in the H state, the LED ON/OFF circuit 33 supplies power to the LEDs 61 to light the same. As the LED ON signal LON is periodically switched between the L state and the H state, the LEDs 61 are made blink.

(2) The control unit 30 makes the speaker 25 generate the alert sound. For this purpose, the control unit 30 turns the audio signal switching signal ACH to the H state, making the signal switching circuit 52 switch to the side of the control unit 30, so that the audio signal of the alert sound is input into the signal switching circuit 52. If an internal space of the speaker grill 18 is completely filled up with the water, the alert sound can go out of the transceiver 1 and reach the user.

(3) The control unit 30 turns the power supply keep-alive signal PON to the H state. Specifically, the control unit 30 feeds the power supply keep-alive signal PON set to the H state to the OR circuit 42 to keep the transceiver 1 in the power-on state regardless of the state of the power switch-on signal PSON during execution of a series of operations to cope with the submergence situation (including the submergence notification operation and the speaker grill drainage operation).

When the submergence signal WET turns from the H state to the L state subsequently, the control unit 30 recognizes that the transceiver 1 has been picked up from the water surface, and performs the following operations:

(1) The control unit 30 terminates the alert sound and generates the drain sound. Specifically, the control unit 30 switches the audio signal input into the signal switching circuit 52 from the alert sound signal to the drain sound signal.

(2) The control unit 30 switches the power voltage for the AF amplifier 53 to the high voltage. For this purpose, the control unit 30 turns the voltage switching signal ECH output to the booster circuit 54 to the H state.

(3) The control unit 30 activates a timer T1 for measuring the lapse of the blinking continuation time DURATION and a timer T2 for measuring the lapse of a time period during which the drain sound is generated. The transceiver 1 allows the user to set the blinking continuation time DURATION which is a time-out period of the timer T1 between 0 and 30 seconds. A time-out period of the timer T2 which defines the time period during which the drain sound is generated may be appropriately set in accordance with the size and shape of the speaker grill 18, the output of the speaker 25, and the like. For example, a time period of about 10 seconds will be appropriate for this time-out period.

The transceiver 1 may be configured to allow the user to set the time period during which the drain sound is generated. In this case, the transceiver 1 may be configured such that an upper limit is defined for the time-out period of the timer T2 and a value of the time-out period exceeding this upper limit will be rejected should the user attempt to set such a time-out period value from a viewpoint of stress posed on the speaker 25 by the drain sound. The transceiver 1 may also be configured to allow the user to generate the drain sound by manual operation.

When the timer T1 times-out subsequently, the control unit 30 makes the LEDs 61 stop blinking and returns the LED ON signal LON to a state before the submergence. Specifically, if the backlight LEDs 61 have been lit before the submergence, the control unit 30 keeps the LED ON signal LON at the H state. If the LEDs 61 have not been lit before the submergence, on the contrary, the control unit 30 keeps the LED ON signal LON at the L state.

When the timer T2 times-out, the control unit 30 terminates generation of the drain sound. Specifically, the control unit 30 stops outputting the drain sound signal and switches the audio signal switching signal ACH from the H state to the L state, making the signal switching circuit 52 switch to the side of the electronic volume controller 51. Further, the control unit 30 turns the voltage switching signal ECH to the L state and thereby switches the power voltage supplied to the AF amplifier 53 to the low voltage.

Until one of the timers T1, T2 time-out after the transceiver 1 has been picked up from the water surface, the control unit 30 keeps the blinking of the LEDs 61 and generation of the drain sound activated at the same time. Even if the user can not hear the drain sound from the transceiver 1 that has been retrieved, the blinking of the LEDs 61 permits the user to recognize that the drain sound is actually generated.

When both of the timers T1, T2 time-out, the control unit 30 terminates both the blinking of the LEDs 61 and generation of the drain sound and then switches the power supply keep-alive signal PON to the L state. If the power switch-on signal PSON has been turned to the H state by manipulating the power key 170, the transceiver 1 is left in the power-on state. If the power switch-on signal PSON is currently in the L state, however, the transceiver 1 is powered off when the power supply keep-alive signal PON is switched to the L state. Specifically, the control unit 30 makes the power supply circuit 43 stop supplying the electric power.

FIGS. 3A to 3E are diagrams representing examples of submergence notification operation setup screens. These setup screens are presented when the transceiver 1 has been switched to a setup mode by manipulating the key panel 17. On any of the setup screens, the user should move a cursor to a desired menu item by pressing one or more of the direction keys 171 and then pressing the select key before the user can perform setup operations regarding the relevant menu item. Also, on any of the setup screens, the user can quit a current setup menu by selecting [EXIT] and pressing the select key or return to a screen presented immediately before by selecting [BACK] and pressing the select key.

Figure 3A:
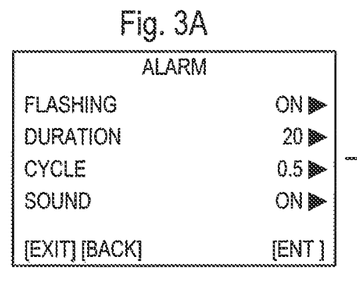
FIGS. 3A to 3E are diagrams representing examples of setup screens presented on a display of the transceiver.

FIG. 3A is a diagram representing a menu screen (ALARM) which allows the user to set up option items for the submergence notification operation. This screen presents current settings of an On/Off state of the blinking (FLASHING) of the LEDs 61, the blinking continuation time (DURATION), the blinking intervals (CYCLE) and the alert sound (SOUND), as well as a triangle mark which is used when proceeding to a sub-menu screen for each option item.

Figure 3B:
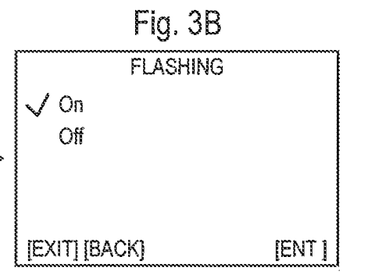

FIG. 3B is a diagram representing a setup screen (FLASHING) which allows the user to switch between the On and Off states of the blinking of the LEDs 61. Presenting On and Off options, this screen allows the user to select whether or not to blink the LEDs 61 by specifying the On or Off option and pressing the select key. In the example of FIG. 3B, the On option is selected as indicated by a check mark so that the LEDs 61 will blink.

Figure 3C:
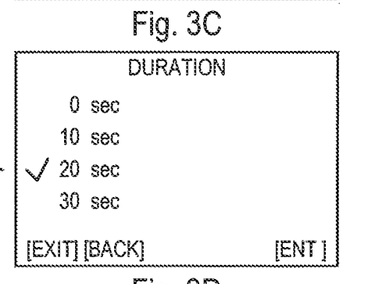

FIG. 3C is a diagram representing a setup screen which allows the user to set the blinking continuation time (DURATION) during which the LEDs 61 blink after retrieval of the transceiver 1 from the water. This screen presents four options of time periods, that is, 0 seconds, 10 seconds, 20 seconds and 30 seconds. The user specifies one of these options and presses the select key to cause the LEDs 61 to blink for the desired blinking continuation time after the transceiver 1 has been picked up from the water surface. In the example of FIG. 3C, the blinking continuation time DURATION is set to 20 seconds as indicated by the check mark placed at the "20 sec" option.

Figure 3D:
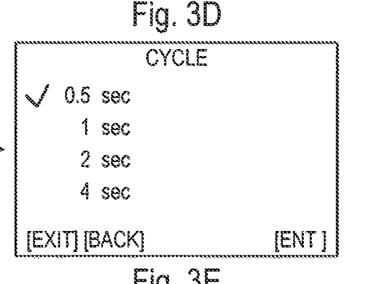

FIG. 3D is a diagram representing a setup screen which allows the user to set the blinking intervals (CYCLE). This screen presents four options of blinking intervals, that is, 0.5 second, 1 second, 2 seconds and 4 seconds. The user specifies one of these options and presses the select key to select the blinking intervals CYCLE at which the LEDs 61 blink after retrieval of the transceiver 1 from the water. In the example of FIG. 3D, the blinking intervals CYCLE is set to 0.5 second as indicated by the check mark placed at the "0.5 sec" option. In the present embodiment, an ON period is fixed while an OFF period is made variable so that the user is allowed to shorten or lengthen the OFF period to vary the blinking intervals CYCLE of the LEDs 61. For example, the ON period is fixed at 0.3 second while the OFF period is made variable among 0.2 second, 0.7 second, 1.7 seconds and 3.7 seconds, so that the blinking intervals CYCLE can be set to 0.5 second, 1 second, 2 seconds or 4 seconds. Incidentally, the ON period and the OFF period in the blinking intervals CYCLE are not limited to the aforementioned combinations. Just for example, the ON period and the OFF period may be shortened or lengthened at the same ratio.

Figure 3E:
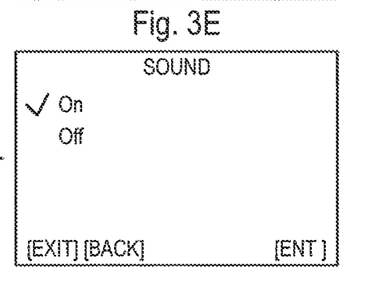

FIG. 3E is a diagram representing a setup screen (SOUND) which allows the user to switch between On and Off states of the alert sound. Presenting On and Off options, this screen allows the user to select whether or not to activate the alert sound by specifying the On or Off option and pressing the select key. In the example of FIG. 3E, the On option is selected as indicated by the check mark so that the alert sound will be generated.

Figure 4:
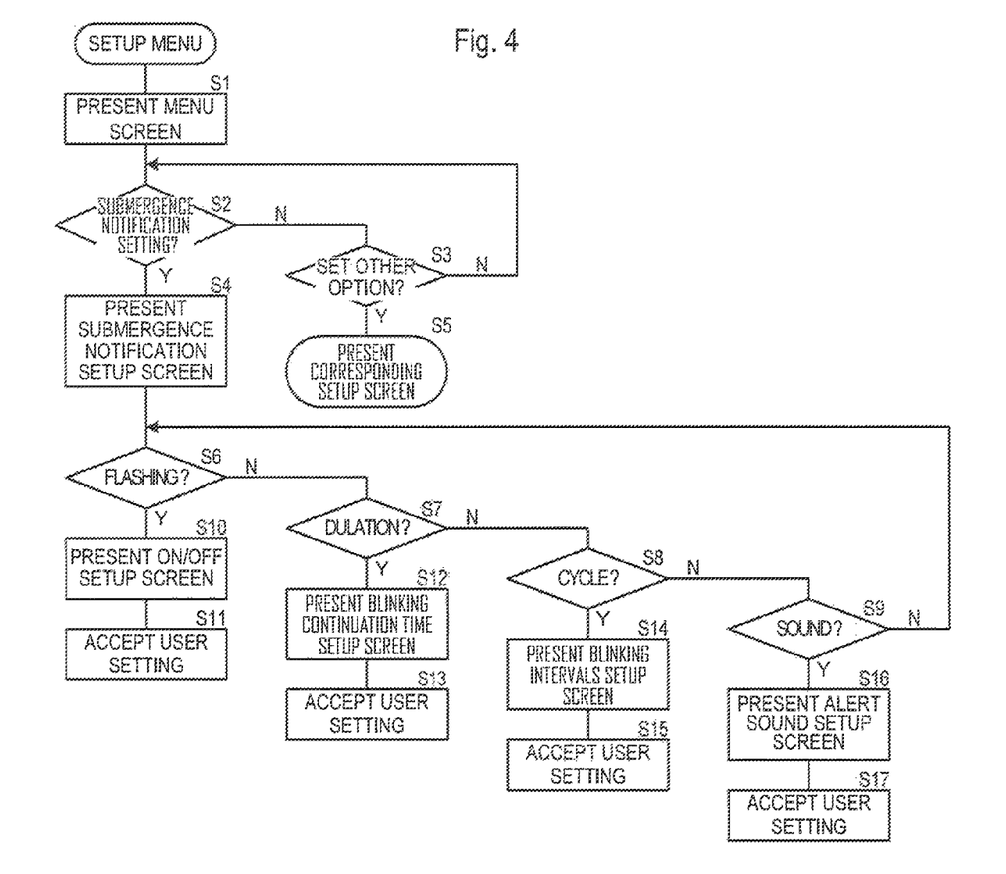
FIG. 4 is a flowchart representing operations performed by a control unit of the transceiver.

FIG. 4 is a flowchart representing setup operations performed on the setup menu. When the user selects the setup mode by manipulating the key panel 17, the control unit 30 enables a sequence of setup operations. First, the control unit 30 presents the menu screen indicating a list of option items (S1). If the user selects a submergence notification setup option on this menu screen to set parameters of the submergence notification operation (Yes in S2), the control unit 30 proceeds to step S4 to present a submergence notification setup screen (ALARM) of FIG. 3A. If the user selects any other option (Yes in S3), the control unit 30 proceeds to step S5 to present a corresponding setup screen. The submergence notification setup screen allows the user to perform settings related to the blinking of the LEDs 61 and generation of the alert sound.

On the submergence notification setup screen, the user can select any of the option items displayed to present one of the following sub-menu screens: blinking On/Off setup screen (FLASHING), blinking continuation time setup screen (DURATION), blinking intervals setup screen (CYCLE) and alert sound setup screen (SOUND) (S6-S9). When the user selects "FLASHING" on the submergence notification setup screen (Yes in S6), the control unit 30 presents the blinking On/Off setup screen of FIG. 3B (S10) and accepts a user setting of the blinking On/Off state (S11). When the user selects "DURATION" on the submergence notification setup screen (Yes in S7), the control unit 30 presents the blinking continuation time setup screen of FIG. 3C (S12) and accepts a user setting of the blinking continuation time DURATION (S13). When the user selects "CYCLE" on the submergence notification setup screen (Yes in S8), the control unit 30 presents the blinking intervals setup screen of FIG. 3D (S14) and accepts a user setting of the blinking intervals (S15). Also, when the user selects "SOUND" on the submergence notification setup screen (Yes in S9), the control unit 30 presents the alert sound setup screen of FIG. 3E (S16) and accepts a user setting of the alert sound On/Off state (S17).

The user can enter the settings for selecting whether or not to activate the blinking of the LEDs 61 and generation of the alert sound in the event of a submergence situation, and for determining the blinking intervals and the blinking continuation time, if the blinking of the LEDs 61 is activated, by performing the above-described operations. The control unit 30 executes the below-described operations in the event of the submergence situation on the basis of the aforementioned settings.

Referring now to flowcharts of FIGS. 5 to 7A/7B, the aforementioned submergence monitoring process performed by the control unit 30 is described. While the present embodiment uses a status flag ST indicating a stage of the submergence monitoring process, this arrangement is not absolutely necessary. The status flag ST takes one of the following four values: "0", "1", "2" and "3" among which "0" is a default value.

Figure 5:
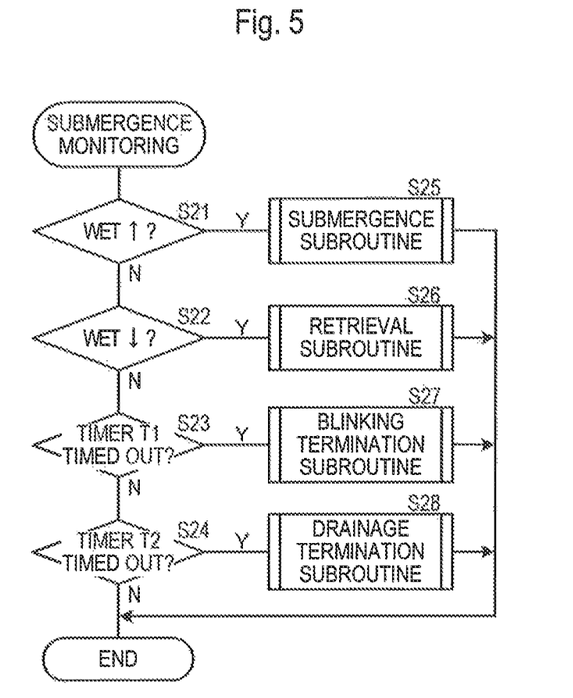
FIG. 5 is a flowchart representing operations performed by the control unit of the transceiver.

FIG. 5 is a flowchart representing a main routine of the submergence monitoring process which is executed at prescribed time intervals (at 10-ms intervals, for example). During execution of this process, the control unit 30 determines whether the submergence signal WET indicating the submergence situation has been switched from the L state to the H state (S21), whether the submergence signal WET has been switched from the H state to the L state (S22), whether the timer T1 has timed out (S23), and whether the timer T2 has timed out (S24).

The control unit 30 detects that the submergence signal WET has turned from the L state to the H state, or vice versa, on the basis of a comparison between the submergence signal WET and the status flag ST. Specifically, the control unit 30 determines that the submergence signal WET has turned from the L state to the H state if the H state of the submergence signal WET is detected when the value of the status flag ST is other than "1". Since the value of the status flag ST is overwritten by "1" in a submergence subroutine executed immediately thereafter, the condition "ST≠1 and WET=H" is not satisfied unless the transceiver 1 which has been once retrieved is dropped again in the water. Meanwhile, the status flag ST is reset to "0" when the control unit 30 is set to operate, and the condition "ST=0 and WET=H" is satisfied when the control unit 30 is activated and first executes the main routine of FIG. 5 even if the transceiver 1 in the power-off state is dropped in the water. Therefore, the control unit 30 can detect that the submergence signal WET has turned to the H state even in such a situation. Also, the control unit 30 determines that the submergence signal wet has turned from the H state to the L state upon detecting the L state of the submergence signal WET under conditions where the value of the status flag ST is "1".

Figure 6A:
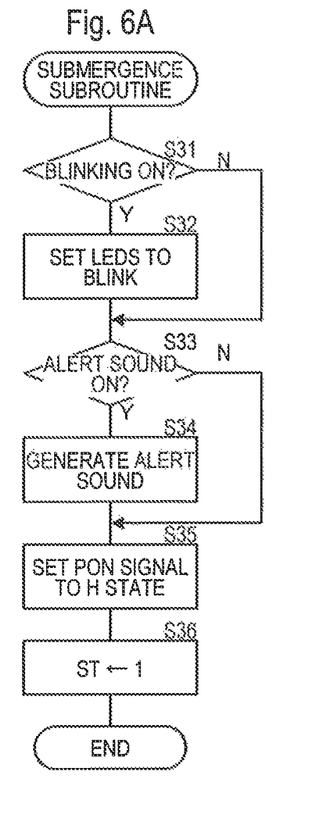
FIGS. 6A and 6B are flowcharts representing operations performed by the control unit of the transceiver.

If the submergence signal WET has turned from the L state to the H state (Yes in S21), the control unit 30 recognizes that the transceiver 1 has been dropped in the water and executes the submergence subroutine depicted in FIG. 6A (S25). If the submergence signal WET has turned from the H state to the L state (Yes in S22), the control unit 30 recognizes that the transceiver 1 has been picked up from the water surface and executes a retrieval subroutine depicted in FIG. 6B (S26). If the timer T1 has timed out (Yes in S23), the control unit 30 recognizes that the blinking continuation time of the LEDs 61 has ended and executes a blinking termination subroutine depicted in FIG. 7A (S27). Then, if the timer T2 has timed out (Yes in S24), the control unit 30 recognizes that the time period during which the drain sound is generated has ended and executes a drainage termination subroutine depicted in FIG. 7B (S28).

Described in the following with reference to FIGS. 6A, 6B, 7A and 7B are the submergence subroutine, the retrieval subroutine, the blinking termination subroutine and the drainage termination subroutine.

FIG. 6A is a flowchart representing the submergence subroutine which is executed when the submergence signal WET has turned from the L state to the H state. In the submergence subroutine, the control unit 30 first determines whether or not the blinking of the LEDs 61 is activated (On state) (S31). If the blinking of the LEDs 61 is activated (Yes in S31), the control unit 30 sets the LEDs 61 to blink (S32). For this purpose, the control unit 30 initiates an LED ON signal generating routine which is a routine for making the LED ON signal LON alternate between the H and L states at the blinking intervals CYCLE set in step S15 and feeding the LED ON signal LON thus controlled to the LED ON/OFF circuit 33. If the blinking of the LEDs 61 is deactivated (Off state) (No in S31), the control unit 30 skips step S32 and proceeds to step S33.

In step S33, the control unit 30 determines whether the alert sound is activated. If the alert sound is activated (Yes in S33), the control unit 30 starts the generation of the alert sound (S34). For this purpose, the control unit 30 initiates an alert sound signal generating routine which is a routine for generating an alert sound signal waveform (e.g., a 1-kHz sine wave having a maximum possible amplitude). The generated signal waveform is input into the signal switching circuit 52. If the alert sound is deactivated (No in S33), the control unit 30 skips step S34 and proceeds to step S35. In step S35, the control unit 30 sets the power supply keep-alive signal PON to the H state. Then, the control unit 30 sets the status flag ST to "1" (S36) and quits the submergence subroutine.

Figure 6B:
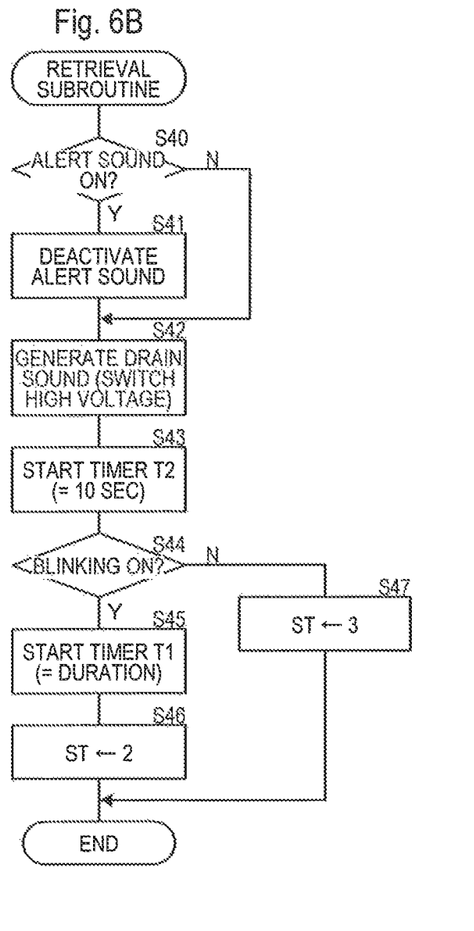

FIG. 6B is a flowchart representing the retrieval subroutine which is executed when the submergence signal WET has turned from the H state to the L state. The control unit 30 first determines whether the alert sound is activated (On state) (S40). If the alert sound is activated (Yes in S40), the control unit 30 deactivates the alert sound (S41). For this purpose, the control unit 30 terminates the alert sound signal generating routine. If the alert sound is deactivated (Off state) (No in S40), on the contrary, the control unit 30 skips step S41 and proceeds to step S42. In step S42, the control unit 30 commences the speaker grill drainage operation for generating the drain sound. For this purpose, the control unit 30 initiates a drain sound signal generating routine and turns the voltage switching signal ECH output to the booster circuit 54 to the H state. The drain sound signal generating routine is a routine for generating a drain sound signal waveform (e.g., a 300-Hz rectangular wave having a maximum possible amplitude). The generated signal waveform is input into the signal switching circuit 52. At the same time, the control unit 30 starts the timer T2 which is used for managing the time period during which the drain sound is generated.

Subsequently, the control unit 30 determines whether or not the blinking of the LEDs 61 is activated (On state) (S44). If the blinking of the LEDs 61 is activated (Yes in S44), the control unit 30 starts the timer T1 which is used for managing the blinking continuation time DURATION after retrieval of the transceiver 1 (S45), sets the status flag ST to "2" (S46) and quits the retrieval subroutine. If the blinking of the LEDs 61 is deactivated (Off state) (No in S44), the control unit 30 sets the status flag ST to "3" (S47) and quits the retrieval subroutine.

Figure 7A:
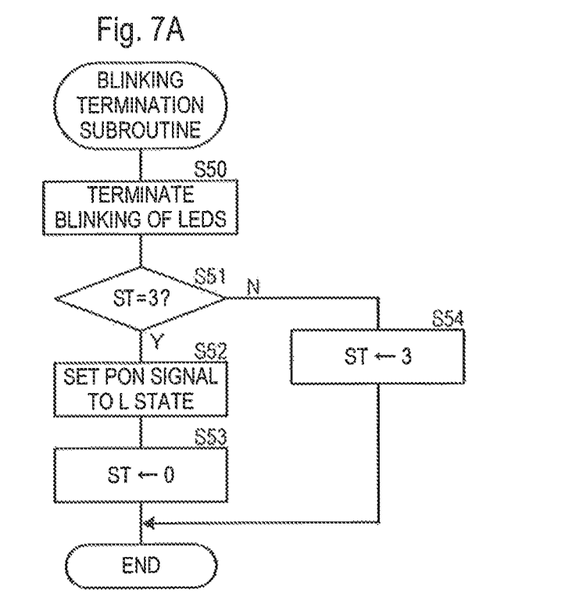
FIGS. 7A and 7B are flowcharts representing operations performed by the control unit of the transceiver.

FIG. 7A is a flowchart representing the blinking termination subroutine which is executed when the timer T1 has timed out. In this subroutine, the control unit 30 first terminates the blinking of the LEDs 61 (S50). For this purpose, the control unit 30 quits the LED ON signal generating routine. Subsequently, the control unit 30 determines whether or not the value of the status flag ST is "3" which indicates that the other timer (timer T2) has already timed out (S51). If the status flag ST is set to "3" (Yes in S51), the control unit 30 turns the power supply keep-alive signal PON from the H state to the L state (S52), sets the status flag ST to "0" which indicates that the transceiver 1 is not in the submergence situation (S53), and quits the blinking termination subroutine. If the value of the status flag ST is not "3" (ST=2) (No in S51), the control unit 30 sets the status flag ST to "3" (S54) and quits the blinking termination subroutine.

Figure 7B:
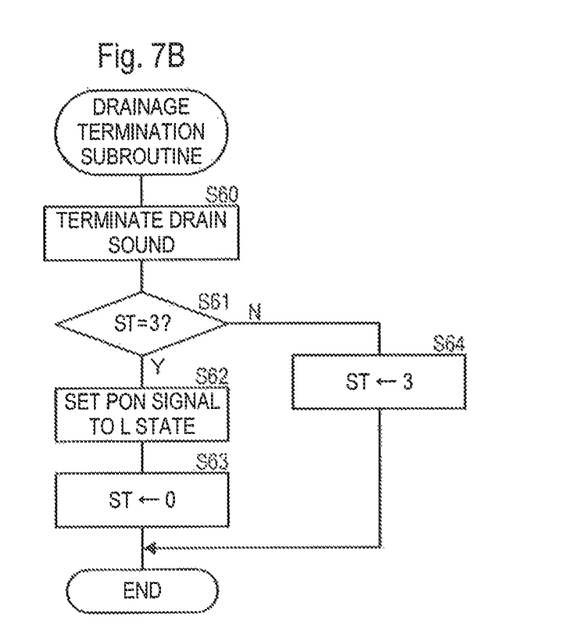

FIG. 7B is a flowchart representing the drainage termination subroutine which is executed when the timer T2 has timed out. In this subroutine, the control unit 30 first terminates the speaker grill drainage operation (S60). For this purpose, the control unit 30 quits the drain sound signal generating routine, turns the audio signal switching signal ACH to the L state to switch the signal switching circuit 52 to the side of the electronic volume controller 51, and turns the voltage switching signal ECH to the L state to switch the source voltage supplied to the AF amplifier 53 to the low voltage. Subsequently, the control unit 30 determines whether or not the value of the status flag ST is "3" which indicates that the timer T1 is not operating or has already timed out (S61). If the status flag ST is set to "3" (Yes in S61), the control unit 30 turns the power supply keep-alive signal PON from the H state to the L state (S62), sets the status flag ST to "0" which indicates that the transceiver 1 is not in the submergence situation (S63), and quits the drainage termination subroutine. If the value of the status flag ST is not "3" (ST=2) (No in S61), the control unit 30 sets the status flag ST to "3" (S64) and quits the blinking termination subroutine.

While the foregoing embodiment has been described, by way of example, with reference to the hand-held transceiver for marine radio communications, electronic apparatuses of the present invention are not limited to the hand-held transceiver. For example, the electronic apparatus may be a non-portable apparatus.

Additionally, although the transceiver 1 of the embodiment has a waterproof, water-floatable construction (having a relative density smaller than that of water), the present invention is applicable to a electronic apparatus whose relative density is equal to or larger than the relative density of water.

It will be obvious to those having skill in the art that many changes may be made in the above-described details of the preferred embodiments of the present invention. The scope of the present invention, therefore, should be determined by the following claims.

What is claimed is:
1. An electronic apparatus comprising:
  an enclosure that is a casing;
  submergence detector for detecting submergence of the electronic apparatus including a situation where the electronic apparatus has been dropped and stays afloat on the water surface and a situation where the electronic apparatus has been dropped and stays underwater as well as a situation where the electronic apparatus has been retrieved from the water;

a light-emitting device that emits light;

an illumination circuit for lighting the light-emitting device when an illumination signal is input;

a controller for making the light-emitting device blink by generating the illumination signal at prescribed blinking intervals at least during a period from a point of submergence to a point of retrieval of the electronic apparatus and inputting the illumination signal to the illumination circuit;

a battery that supplies electric power, and a power control circuit for activating the controller by supplying the electric power thereto from the battery when the submergence detector detects submergence, wherein the submergence detector, the light-emitting device, the illumination circuit, the controller, the battery and the power controller circuit are equipped with the enclosure.

2. The electronic apparatus according to claim 1 further comprising:

an operating device manipulated by a user; wherein the controller accepts a setting of the blinking intervals entered through the operating device and generates the illumination signal at the set blinking intervals.

3. The electronic apparatus according to claim 1, wherein the controller continues to generate the illumination signal at the blinking intervals for a prescribed illumination continuation time even after the submergence detector has detected retrieval of the electronic apparatus.

4. The electronic apparatus according to claim 3 further comprising:

an operating device manipulated by a user;

wherein the controller accepts a setting of the blinking intervals entered through the operating device and continues to generate the illumination signal at the blinking intervals for the prescribed illumination continuation time.

5. The electronic apparatus according to claim 1 further comprising:

a display; and a key panel; wherein the light-emitting device backlights at least one of the display and the key panel.

6. The electronic apparatus according to claim 1, wherein the submergence detector includes a pair of electrodes, and the submergence detector detects submergence of the electronic apparatus when the electrodes are conducted to each other, and detects retrieval of the electronic apparatus when the electrodes become no longer conducted to each other.

7. The electronic apparatus according to claim 1 further comprising:

a speaker; and an amplifier for driving the speaker;

wherein the controller generates an alert sound signal for notifying a user of the location of the electronic apparatus itself during the period from the point of submergence to the point of retrieval of the electronic apparatus and inputs the alert sound signal to the amplifier.

8. An electronic apparatus that conducts wireless communication with an external device, comprising:

a battery that supplies electric power;

a controller that controls the wireless communication, the controller being in ON state or OFF state, in the ON state where the controller consumes the electric power for being ready for the wireless communication, and in the OFF state where the controller does not consume the electric power;

a light-emitting device that emits light in correspondence with an illumination signal sent from the controller;

a submergence detector that detects a submergence of the electronic apparatus in water and a retrieval of the electronic apparatus from the water;

a power control circuit that turns the controller from the OFF state to the ON state, and continues to supply the electric power to the submergence detector regardless of the ON/OFF state of the controller so that the submergence detector operates while the controller is in the OFF state; wherein when the controller is in the OFF state and the submergence detector detects the submergence of the electronic apparatus, the power control circuits turns the controller to the ON state, further the controller makes the light-emitting device blink by sending the illumination signal during a period from when the submergence is detected to when the retrieval is detected.

9. The electronic apparatus according to claim 8, wherein:

the submergence detector is configured with a pair of separated electrodes that are disposed on a surface of the electronic apparatus, the surface being designed to be under the water when the electronic apparatus stays afloat, when the electrodes are electrically conducted, the controller determines the submergence and when the conductivity between the electrodes is cut, the controller determines the retrieval.

10. The electronic apparatus according to claim 9, further comprising:

a speaker that connects to the controller and generates an alert sound which ranges within 1 kHz to 3 kHz and a drain sound which ranges within 100 Hz to 500 Hz, wherein when the controller determines the submergence, the controller causes the speaker to make the alert sound, and when the controller determines the retrieval, the controller causes the speaker to make the drain sound.

* * * * *